United States Patent
Ludvik et al.

(10) Patent No.: US 10,017,257 B2
(45) Date of Patent: Jul. 10, 2018

(54) COMBINED VOC—O2—CO2 TREATMENT SYSTEM

(71) Applicant: HONEYWELL INTERNATIONAL INC., Morristown, NJ (US)

(72) Inventors: Jan Ludvik, Jindrichuv Hradec (CZ); Peter M Michalakos, Arlington Heights, IL (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 25 days.

(21) Appl. No.: 14/699,887

(22) Filed: Apr. 29, 2015

(65) Prior Publication Data
US 2016/0318613 A1 Nov. 3, 2016

(51) Int. Cl.
*B01D 53/04* (2006.01)
*B64D 13/06* (2006.01)

(52) U.S. Cl.
CPC ......... *B64D 13/06* (2013.01); *B01D 53/0462* (2013.01); *B01D 2253/108* (2013.01); *B01D 2257/502* (2013.01); *B01D 2257/504* (2013.01); *B01D 2257/708* (2013.01); *B01D 2257/90* (2013.01); *B01D 2258/06* (2013.01); *B01D 2259/402* (2013.01); *B01D 2259/4575* (2013.01); *B64D 2013/067* (2013.01); *B64D 2013/0637* (2013.01); *B64D 2013/0651* (2013.01); *B64D 2013/0681* (2013.01); *B64D 2013/0685* (2013.01); *B64D 2013/0688* (2013.01); *Y02C 10/08* (2013.01); *Y02T 50/56* (2013.01)

(58) Field of Classification Search
CPC ................... B01D 53/04; B64D 13/06; B64D 2013/0674; F25B 17/083; F25B 49/046; Y02T 50/56

USPC ...... 55/356, 385.3, 385.1; 95/148, 150, 151, 95/153, 154; 96/144, 127, 109, 111, 112, 96/146, 141, 116, 131, 132, 133; 422/120, 122

See application file for complete search history.

(56) References Cited

U.S. PATENT DOCUMENTS

| | | | |
|---|---|---|---|
| 3,355,860 A | 12/1967 | Arnoldi | |
| 4,428,372 A | 1/1984 | Beysel et al. | |
| 4,651,728 A | 3/1987 | Gupta et al. | |
| 4,711,645 A * | 12/1987 | Kumar | B01D 53/047 95/122 |

(Continued)

FOREIGN PATENT DOCUMENTS

| | | |
|---|---|---|
| CN | 102841178 A | 12/2012 |
| EP | 2740666 A1 | 6/2014 |
| JP | 4174606 B2 | 6/2003 |

OTHER PUBLICATIONS

European Search Report in EP Application No. 16165892.7 dated Oct. 7, 2016.

*Primary Examiner* — Robert A Hopkins
*Assistant Examiner* — Minh-Chau Pham
(74) *Attorney, Agent, or Firm* — Shimokaji IP

(57) ABSTRACT

An environmental control system (ECS) includes an air conditioning pack that receives outside air; a regenerative treatment subsystem, wherein the treatment subsystem includes a treatment bed configured to cycle between an adsorption phase and a desorption phase; and a fan that receives recirculated air from the environment and moves the recirculated air to a mixing manifold.

5 Claims, 6 Drawing Sheets

(56) References Cited

U.S. PATENT DOCUMENTS

| | | | | |
|---|---|---|---|---|
| 4,775,484 | A * | 10/1988 | Schmidt | B01D 15/02 210/181 |
| 4,786,294 | A * | 11/1988 | Jonqueres | B01D 53/04 423/228 |
| 4,919,124 | A | 4/1990 | Stevenson et al. | |
| 5,256,103 | A * | 10/1993 | Abthoff | B60H 3/0625 454/139 |
| 5,769,928 | A * | 6/1998 | Leavitt | B01D 53/0446 95/119 |
| 6,027,548 | A * | 2/2000 | Ackley | B01D 53/0446 95/117 |
| 6,212,882 | B1 * | 4/2001 | Greger | B01D 53/944 423/219 |
| 6,423,275 | B1 | 7/2002 | D'Souza | |
| 7,527,670 | B2 * | 5/2009 | Ackley | B01D 53/0462 95/106 |
| 2001/0015131 | A1 * | 8/2001 | Angermann | B01D 53/0415 95/90 |
| 2005/0211090 | A1 | 9/2005 | McCullough | |
| 2006/0117950 | A1 * | 6/2006 | Lessi | B01D 53/047 95/96 |
| 2008/0148937 | A1 * | 6/2008 | Rege | B01D 53/047 95/96 |
| 2009/0145297 | A1 * | 6/2009 | Ferguson | B01D 53/1475 95/90 |
| 2009/0221224 | A1 * | 9/2009 | Centofante | B64D 13/06 454/76 |
| 2011/0277490 | A1 * | 11/2011 | Meirav | B01D 53/60 62/89 |
| 2012/0000220 | A1 * | 1/2012 | Altay | B64D 13/06 62/101 |
| 2012/0006193 | A1 | 1/2012 | Roychoudhury et al. | |
| 2012/0024157 | A1 * | 2/2012 | Maheshwary | B01D 53/047 96/133 |
| 2013/0252526 | A1 * | 9/2013 | Paul | B01J 20/24 454/76 |
| 2014/0020559 | A1 * | 1/2014 | Meirav | B01D 53/0438 95/148 |
| 2014/0033925 | A1 * | 2/2014 | Gueret | B01D 53/02 96/115 |
| 2014/0134056 | A1 * | 5/2014 | Shinoda | B01D 53/66 422/122 |
| 2014/0174292 | A1 * | 6/2014 | Kwon | B01D 53/04 95/139 |
| 2015/0078964 | A1 * | 3/2015 | Meirav | B01D 53/0407 422/120 |
| 2016/0047562 | A1 * | 2/2016 | Bartlett | F24F 5/001 62/115 |

* cited by examiner

COMBINED VOC—O2—CO2 TREATMENT SYSTEM

BACKGROUND OF THE INVENTION

The present invention generally relates to apparatus and methods for treatment of airstreams in an Environmental Control System (ECS) to adjust concentrations of air constituents. The constituents include natural air compounds as well as compounds that may cause odor.

ECSs of various types and complexity are used in military and civil airplane, helicopter, and spacecraft applications. In aircraft for example, airflow from outside the aircraft supplied through engine or APU bleed systems or other air sources including ground supplies and electric compressors, is circulated to occupied compartments, cargo compartments, and electronic equipment bays. The air delivered to cabin and other occupied compartment is usually a mixture of similar amounts of outside air and recirculated cabin air. The quality of this air is generally very good, especially at cruise altitudes and during normal operating conditions.

The source of the outside air is compressed engine air. The cost of this outside air is related to the fuel that the engine uses to compress the air without the benefit of generating thrust. Typically, the compression of outside air in the engine and its conditioning by the ECS is up to 3% of the total fuel burn for the flight. In the 1970's, NASA's studies concluded that recirculating cabin air could reduce fuel burn without compromising air quality. Since then, the ratio of recirculated air into the cabin is roughly 50%, but still provides a high flow rate of outside air per passenger. As the recirculation ratio increases above 50%, there is a possibility that the concentration of compounds that cause odors (volatile organic compounds, or VOC's) or carbon dioxide (CO2) from passenger exhalation, may impact the air quality. Another aspect of interest is the cabin pressure, which is determined in part by the pressure and flow rate of compressed engine air. Aluminum aircraft typically have a cabin pressure equivalent to an 8,000 foot altitude, while that of newer, composite aircraft are at 6,000 feet. The cost of pressurizing the cabin increases with lower equivalent altitudes, not only due to the cost of outside air, but to the strength and weight of the fuselage required to contain the increased pressure. Finally, outside air may contain VOC's, especially during ground operations, that may cause smell-in-cabin (SIC) incidents, which may lead to unscheduled and unwarranted maintenance, flight disruptions, and passenger discomfort.

Therefore, it would be desirable to increase the recirculation rate while maintaining or even improving the current air quality.

SUMMARY OF THE INVENTION

In one aspect of the present invention, an environmental control system (ECS) having constituents in supply air that flows into an environment, wherein the supply air includes outside air and recirculated air that exits the environment comprises an air conditioning pack that receives the outside air; a mix manifold upstream of the environment; a fan intermediate the environment and the mix manifold; and a regenerative treatment subsystem positioned in one of a: first position downstream of the environment; and second position upstream of the environment.

In another aspect of the present invention, an environmental control system (ECS) having constituents in supply air that flows into an environment, wherein the supply air includes outside air and recirculated air that exits the environment comprises an air conditioning pack that receives the outside air; a mix manifold upstream of the environment; a fan intermediate the environment and the mix manifold; and a regenerative treatment subsystem positioned in one of a: first position intermediate the fan and the environment; second position intermediate the mix manifold and the environment; and third position intermediate the fan and the mix manifold.

In yet another aspect of the present invention, a regenerative treatment subsystem in an environmental control system comprises a first treatment bed having a first set of adsorbent areas; and a second treatment bed having a second set of adsorbent areas; wherein the first and second treatment beds can cycle between an adsorption phase and a desorption phase.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may address only one of the problems discussed above. Further, one or more of the problems discussed above may not be fully addressed by any of the features described below.

The present invention generally provides an environmental control system (ECS) that can remove various air constituents in either outside or recirculated air. The outside air may include air entering the ECS through engine or APU bleed systems or other air sources including ground supplies and electric compressors.

As used herein, the term "directly", in connection with a system component being upstream or downstream of another system component, means that between those two system components there is an absence of a third system component to affect a fluid, except for a means (e.g., tube) to flow fluid between the two system components.

First Embodiment

Figure 1:
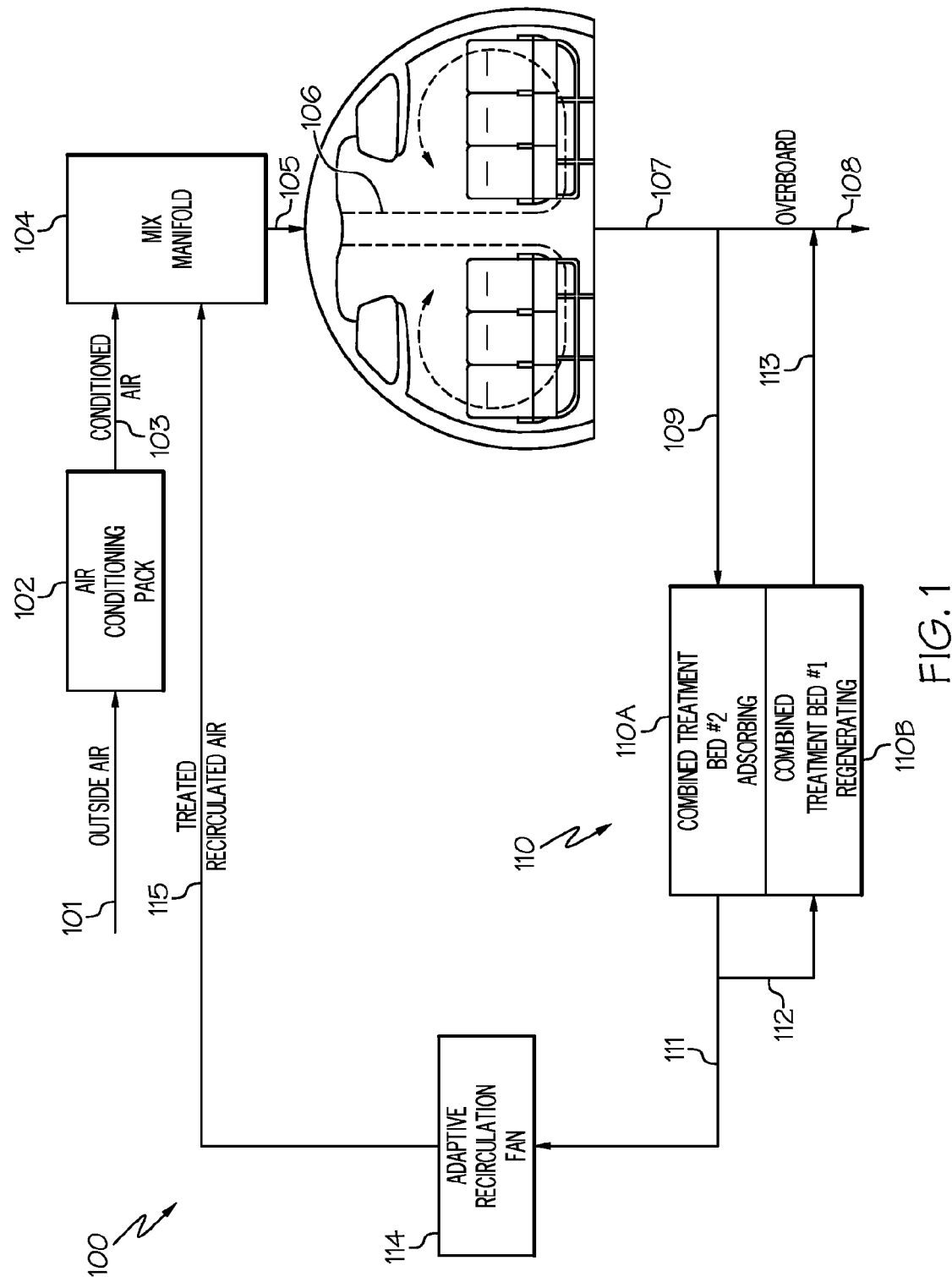
FIG. 1 is a block diagram of an environmental control system according to a first exemplary embodiment of the present invention.

As shown in FIG. 1, an ECS 100 according to a first exemplary embodiment of the present invention may receive outside air 101 which may include constituents such as nitrogen (N2), oxygen (O2), carbon dioxide (CO2), volatile organic compounds (VOC's), and/or carbon monoxide (CO). In embodiments, the VOC's may be present from about 0 ppm to about 10 ppm, the O2 may be present from about 20% to about 21%, the CO2 from 0 to 5,000 ppm, and the CO may be present from about 0 ppm to about 50 ppm. An air conditioning pack 102 may receive and cool the outside air 101. The air conditioning pack 102 may be conventional in design, such as that shown in U.S. Pat. No. 6,381,969 and incorporated herein in its entirety by reference.

From the air conditioning pack 102, conditioned air 103 may flow into a mixing manifold 104 directly downstream of the pack 102. In the mixing manifold 104, the conditioned air 103 can mix with treated recirculation air 115, and distributed as mixed air 105 into a cabin and/or cockpit environment 106 directly downstream of the mix manifold 104.

In cabin and/or cockpit environment 106, the composition of air may be affected so that cabin outflow air 107 may include different concentrations of air constituents such as VOC's, O2, CO and/or CO2 as the outside air 101 or the air entering the cabin or cockpit environment 105. In embodiments, in the outflow air 107, the VOC's may be present from about 0 ppm to about 10 ppm, the O2 may be present from about 20% ppm to about 21%, and the CO2 may be present from about 400 ppm to about 5000 ppm.

The air 107 exiting the environment 106 can be vented overboard 108 and/or recirculated as recirculation air 109.

The recirculation air 109 can be treated by a regenerative treatment subsystem 110 directly downstream of the environment 106. The subsystem may include two or more treatment beds, each of which can adsorb and desorb constituent(s). This can allow for a first treatment bed 110A to be in an adsorption phase adsorbing constituents while a second treatment bed 110B is in a desorption phase desorbing constituents and, thus regenerating itself to adsorb constituents. After one or both phases are completed, the first bed can switch to a desorption phase and the second bed can switch to an adsorption phase. Thereby, the treatment beds can continue to cycle between adsorption and desorption phases.

For example, in FIG. 1, and as further described in reference to FIG. 4 below, a first treatment bed 110A may adsorb one or more different air constituents, such as VOC's, N2, CO and/or CO2. Concurrently, a second treatment bed 110B may desorb one or more air constituents, such as VOC's, N2, CO and/or CO2. In embodiments, following adsorption by the first treatment bed 110A and/or desorption by the second treatment bed 110B, the beds may switch phases whereby the first treatment bed 110A desorbs constituents and the second treatment bed 110B adsorbs constituents.

In FIG. 1, the switching of phases is schematically depicted by air 111 exiting the bed 110A and a fraction thereof entering, as air 112, the bed 110B. By such switching, the second treatment bed 110B can adsorb constituents in the recirculated air 109, while the first treatment bed 110A can desorb constituents to overboard 113. The first and second beds 110A-B may continue to cycle between adsorption and desorption phases as needed.

In embodiments, the regenerative treatment subsystem 110 may adsorb VOC's such that the VOC's exiting the subsystem 110 in treated air 111 may be at a level of from about 0 ppm to about 1 ppm, or from about 0 ppm to about 0.1 ppm, or from about 0 ppm to about 0.01 ppm. In embodiments, the regenerative treatment subsystem 110 may adsorb N2 such that the O2 exiting the subsystem 110 in the treated air 111 may be at a level of from about from about 21% to about 24%, or from about 22% to about 26%, or from about 22% to about 28%.

In embodiments, the regenerative treatment subsystem 110 may adsorb CO2 such that the CO2 exiting the subsystem 110 in the treated air 111 may be at a level of from about 1000 ppm to about 2000 ppm, or from about 400 ppm to about 1000 ppm, or from about 0 ppm to about 400 ppm.

From the regenerative treatment subsystem 110, the treated air 111 can be pulled by an adaptive recirculation fan 114, directly downstream of the subsystem 110, that may receive and modulate the flow of the treated recirculated air 111. The fan 114 may be of conventional design, such as that shown in U.S. Pat. No. 5,145,124 which is incorporated in its entirety herein. From the fan 114, air 115 may return to the mixing manifold 104.

Second Embodiment

Figure 2:
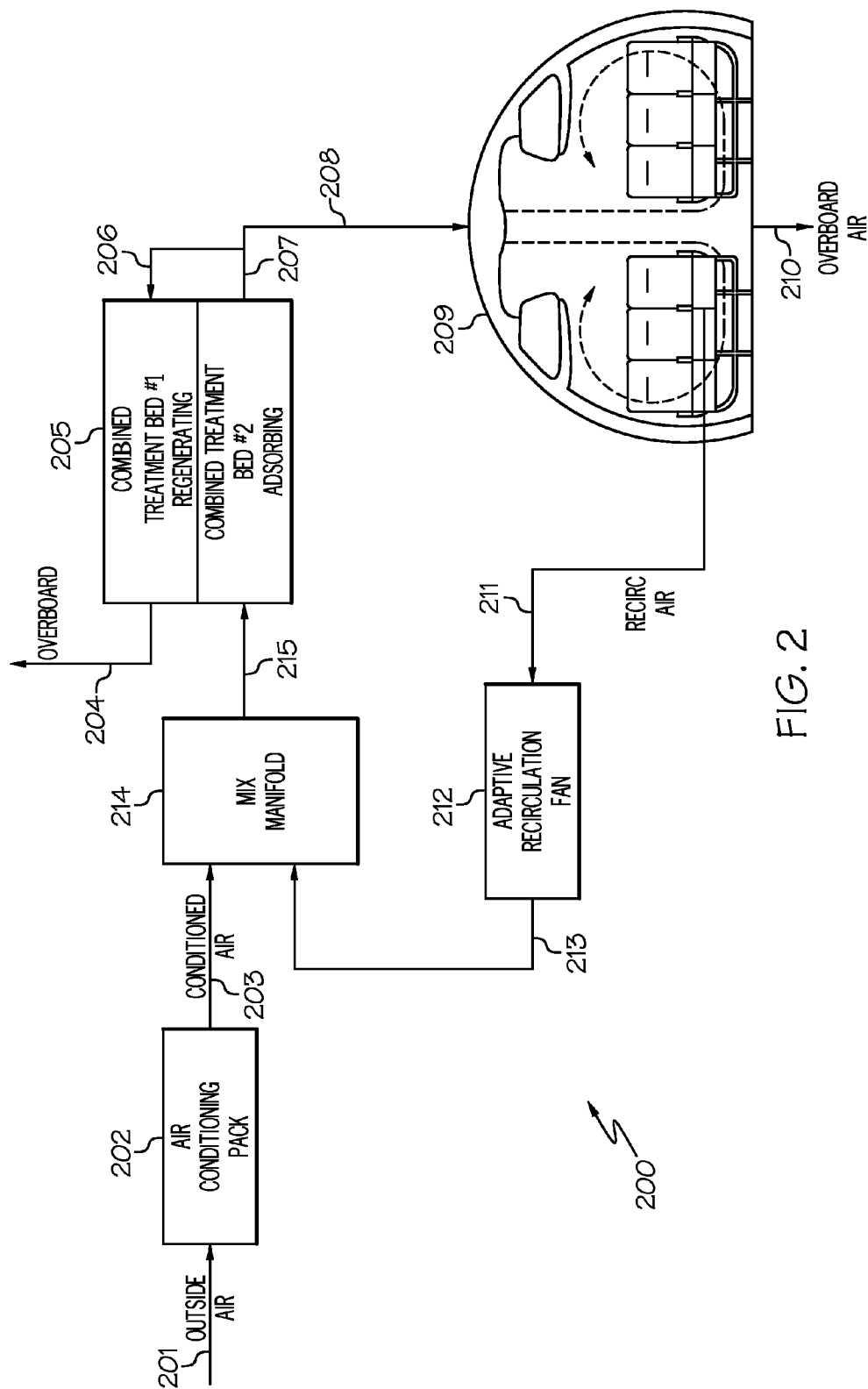
FIG. 2 is a block diagram of an environmental control system according to a second exemplary embodiment of the present invention.

FIG. 2 depicts a second exemplary embodiment of the present invention. According to the second exemplary embodiment, an ECS 200 is similar to the ECS 100 depicted in FIG. 1 including the switching of adsorption and desorption phases; however, the ECS 200 can include a regenerative treatment subsystem downstream of a mix manifold and upstream of a cabin and cockpit environment.

In FIG. 2, an outside air 201 can enter an air conditioning pack 202. Conditioned air 203 can exit the pack 202 and can enter a mix manifold 214 directly downstream of the pack 202.

From the mix manifold 214, a mixed air 215 can enter a regenerative treatment subsystem 205 directly downstream of the manifold 214. From the subsystem 205, a portion of a treated air 207 can go to overboard 204 assisting the desorption phase of one of the treatment beds, and the rest of the treated air 207, as treated air 208, can go to an environment 209, such as an aircraft cabin and/or cockpit.

Air in the environment 209 may exit, and partially or wholly go to overboard 210, or partially or wholly flow as recirculated air 211. The balance between air vented overboard 210 and recirculated air 211 can be determined by a cabin pressure control schedule. The recirculated air 211 may include constituents such as VOC's, O2, and/or CO2. In embodiments, the recirculated air 211 may have the following initial concentration of constituents prior to application of treatment. The VOC's may be present from about 0 ppm to about 10 ppm, the O2 may be present from about 20% to about 21%, and the CO2 may be present from about 400 ppm to about 5000 ppm.

The recirculated air 211 can flow through an adaptive recirculation fan 212, directly downstream of the environment 209, and from the fan 212, air 213 can flow into the mix manifold 214 where the air 213 can mix at varying amounts, from zero to 100%, with the conditioned air 203.

Third Embodiment

Figure 3:
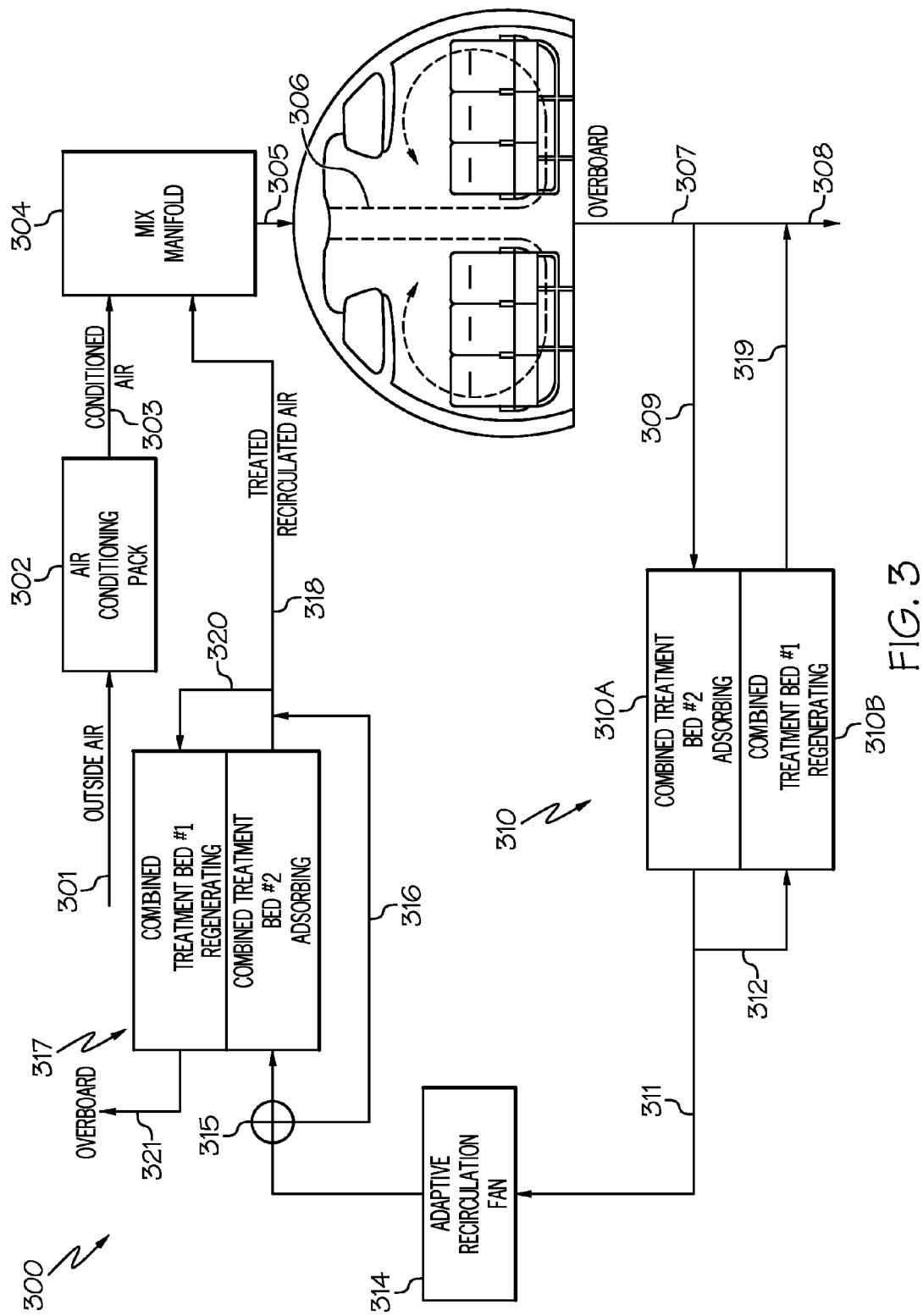
FIG. 3 is a block diagram of an environmental control system according to a third exemplary embodiment of the present invention.

FIG. 3 depicts a third exemplary embodiment of the present invention. Therein, an ECS 300 is similar to the ECS 100 depicted in FIG. 1; however, the ECS 300 includes two regenerative treatment subsystems that can treat recirculated cabin air. The two regenerative treatment subsystems have dissimilar configurations—such as their physical designs, the types of constituents or air constituent they adsorb, and the levels of constituents or air constituent they adsorb.

In FIG. 3, an outside air 301 can be conditioned by an ECS pack 302. From the ECS pack 302, conditioned air 303 can enter a mix manifold 304 directly downstream of the pack 302. From the mix manifold 304, a mixed air 305 can flow into a cabin and/or cockpit environment 306 directly downstream of the manifold 304.

From the environment 306, an air 307 may exit and then go partially or wholly to overboard 308. The air 307 may also flow as recirculated air 309. The recirculated air 309 may include constituents such as VOC's and/or CO2. In embodiments, the VOC's may be present up to about 10 ppm, and the CO2 may be present from about 400 ppm to about 5000 ppm—depending on passenger activity and cabin ventilation rates—and oxygen concentration may be only marginally decreased from ambient air oxygen level of about 21%. These concentrations represent exemplary initial concentrations of constituents prior to application of treatment.

The recirculated air 309 may enter a first regenerative treatment subsystem 310, directly downstream of the environment 306, to remove humidity, volatile organic compounds and carbon dioxide, each in a separate stage (described below in reference to FIG. 4) of a combined adsorption bed 310A-B.

From the first regenerative treatment subsystem 310, a majority (i.e., >50%) of the recirculation air 309 can exit as a treated air 311. A fraction 312 of the treated air 311 can be used to purge the regenerating bed (310A or B) and exit to overboard 319.

The treated air 311 can pass through an adaptive recirculation fan 314, directly downstream of the subsystem 310, and be distributed, by a flow split valve 315, partially or fully to a second regenerative treatment subsystem 317 or bypassed through a duct 316.

The second regenerative treatment subsystem 317, directly downstream of the fan 314, can remove nitrogen and thus generate oxygen enriched air from treated air 311 that has been already purified by the first regenerative treatment subsystem 310.

In embodiments, the first regenerative treatment subsystem 310 may adsorb VOC's and CO2 such that the VOC's exiting the subsystem 310 in the treated air 311 may be at a level of from about 0 ppm to about 1 ppm, or from about 0 ppm to about 0.1 ppm, or from about 0 ppm to about 0.01 ppm. CO2 exiting the subsystem 310 in the treated air 311 may be at a level of from about 1000 ppm to about 2000 ppm, or from about 400 ppm to about 1000 ppm, or from about 0 ppm to about 400 ppm.

In embodiments, the second regenerative treatment subsystem 317 may remove nitrogen thus providing oxygen enriched air such that the O2 exiting the subsystem 317 in the treated air 318 may be at a level of from about from about 21% to about 24%, or from about 22% to about 26%, or from about 22% to about 28%.

From the second regenerative treatment subsystem 317, the air exists as treated air 318. A fraction 320 of treated air 318 can be used to purge the regenerating bed (317A or B) and exit to overboard 321. The treated air 318 may then flow to the mix manifold 304, where the treated air 318 may mix in varying amounts, from zero to 100%, with the conditioned air 303 from ECS conditioning pack 302.

Figure 4:
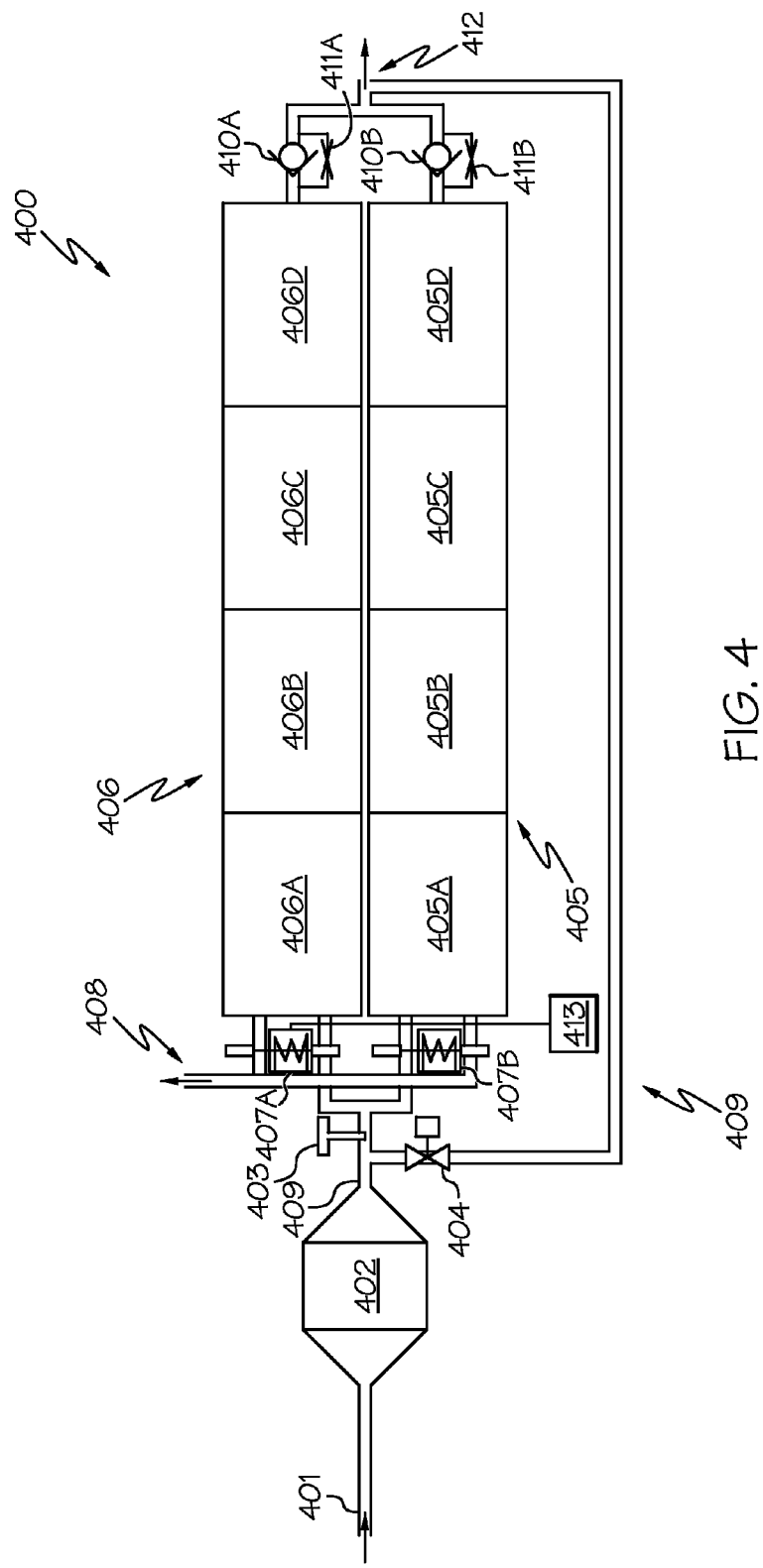
FIG. 4 is a schematic diagram of a combined treatment bed according to an exemplary embodiment of the present invention.

FIG. 4 depicts an exemplary embodiment of a regenerative treatment subsystem 400 that can be employed in the embodiments of an ECS shown in FIGS. 1-3. Although FIG. 4 is depicted to show four adsorbent areas/phases in one treatment bed, fewer or more areas/phases can be employed.

In FIG. 4, a supply air flow 401 can be filtered by a particulate filter 402 to protect downstream apparatus from mechanical damage. The quality of the air flow 401 can be sensed by an air quality sensor 403 that may be able to detect constituents like VOC's, CO2, CO, O2 or N2. Depending on the quality of air 409 sensed by the air quality sensor 403, a valve 404 may bypass, partially or fully, the regenerative treatment beds 405 and 406, through a duct 409. The air stream entering regenerative treatment subsystem 400 can be directed by one of the dual acting solenoid valves 407A and 407B, controlled by a control system 413, to enter one of the combined treatment beds 405 or 406.

FIG. 4 shows the configuration with the valve 407B directing the air stream 409 to only enter the bed 405. The air can pass through individual segments 405A-D (described in reference to FIG. 5) of the combined adsorption bed 405 (or segments 406A-D of bed 406). As an example, the first segment 405A can remove H2O if present in the air flow to protect the downstream segments removing constituents or air constituents like VOC's, CO2, CO or N2. The cross section of the treatment beds 405, 406 can be circular or similar, minimizing the edge and boundary area which are inefficient in air constituent adsorption. A non-return valve 410B may allow the air to pass through and exit the regenerative treatment subsystem as treated air 412 but prevent reversed flow direction and backflow of the treated air through the regenerative bed.

Similarly, the valve 407A can direct the air 409 to the bed 406, through the segments 406A-D, through valve 410A, and exit as treated air 412.

An adsorption phase can be enabled in FIG. 4 by sequence of multiple adsorption segments based on zeolite crystals immobilized in a form of a porous adsorbent bed from different zeolite materials. There are numerous commercially available zeolites for adsorbing particular air constituents. In the present invention, the following zeolites may be used: silica gel or Oxysiv™ by UOP for water adsorption; Oxysiv 5A™ by UOP for CO2 adsorption; and MDX™ by UOP for N2 adsorption for oxygen enrichment.

The listed zeolites above can also adsorb VOC's. The level of adsorbent bed saturation may be determined by expected air composition and time from adsorption phase activation or by air composition sensor downstream of the combined treatment bed (not shown).

A desorption phase can be enabled in FIG. 4 by purging orifice 411A (or 411B), allowing a fraction of treated air 412 to pass the combined treatment bed backwards, supporting the desorption of individual segments 405A-D (or 406A-D) with adsorbed air constituents flowing back through the solenoid valve and venting as overboard air stream 408. Another desorption enabler is heating the bed, then cooling it to return to the ready-to-adsorb state.

Each adsorbent bed may be physically separated from other beds by a coarse support grid allowing airflow 401 to pass through.

FIGS. 5A-5E depict alternative embodiments of one treatment bed for a regenerative treatment subsystem. Generally, a treatment bed can be configured to adsorb/desorb one or more different constituents. The bed can also be configured to alter the time and/or amount of adsorption among different constituents.

Figure 5A:
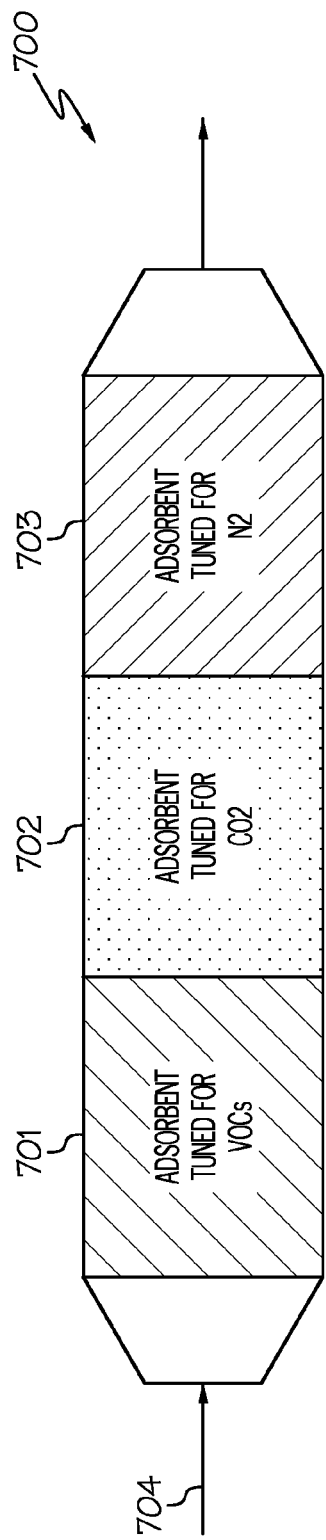
FIGS. 5A-5E are schematic diagrams of single treatment beds according to embodiments of the present invention.

FIG. 5A depicts an exemplary treatment bed 700 that can adsorb VOC's, CO2, and N2 (in that order) in different adsorbent areas 701, 702, 703 as an air flow 704 passes through the bed 700. The time for adsorption/desorption can range from seconds for oxygen enrichment with a large amount of nitrogen removed to minutes or hours for VOC, CO and other low concentration air constituents removal. The amount of adsorbent(s) in each adsorption area can vary according to the concentration of air constituents to be removed from air flow 704 and on the target air constituents downstream of the treatment bed 700.

Although not depicted in FIG. 5A, the adsorbent(s) may reside on a support material(s) such as metallic support grid (as a mean to improve vibration resistance for large beds). The adsorbent(s), in this embodiment, may comprise one or more zeolites. Although the different areas 701, 702, 703 are shown as distinct segments, the present invention includes embodiments where the areas are not distinct and that different zeolites may be mixed throughout the entire bed.

Figure 5B:
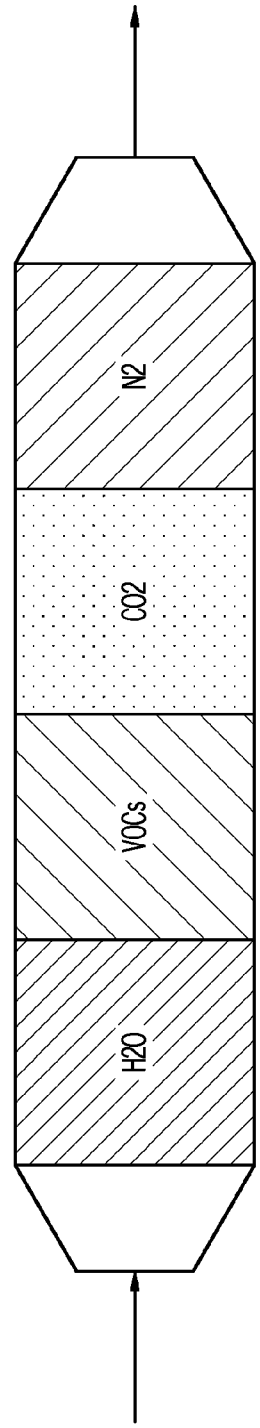

FIG. 5B depicts a treatment bed similar to that shown in FIG. 5A. However, in FIG. 5B, there are four adsorbent areas, with each area having substantially the same adsorption time and/or adsorbent amount, and the phases are ordered H2O, VOC, CO2, and N2. This embodiment can be used for treatment of air streams where significant humidity would negatively affect the performance of latter stages.

Figure 5C:
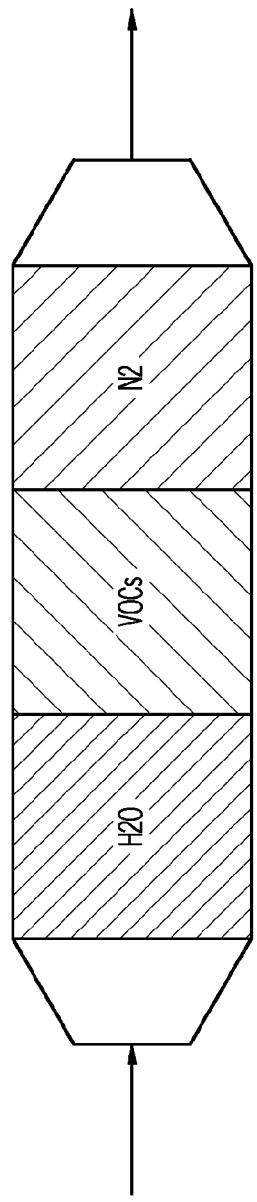

FIG. 5C depicts a three adsorbent area treatment bed for H2O, VOC, and N2 (in that order) with a CO2 removal stage omitted, simplifying the treatment bed for outside air stream treatment which has low CO2 concentrations of approximately of 400 ppm.

Figure 5D:
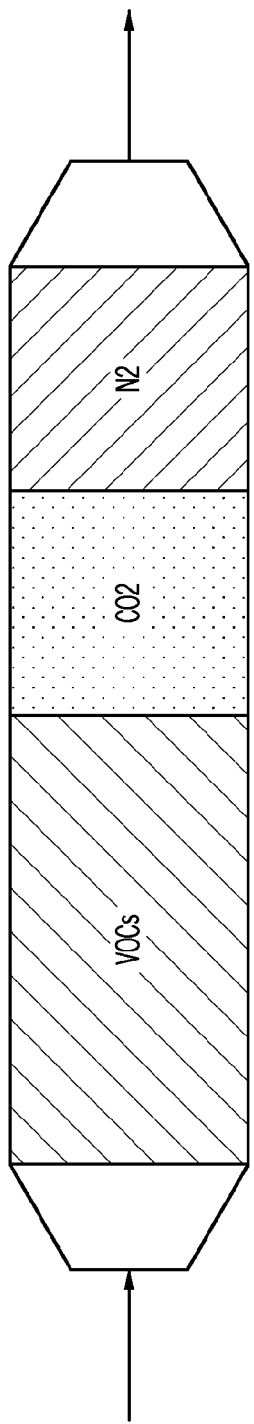

FIG. 5D depicts a three adsorbent area treatment bed for VOC, CO2, and N2 (in that order) where all three areas are unequal in time and/or adsorbent amount—optimized for treatment of air streams with one dominant contaminant or air constituent to be removed.

Figure 5E:
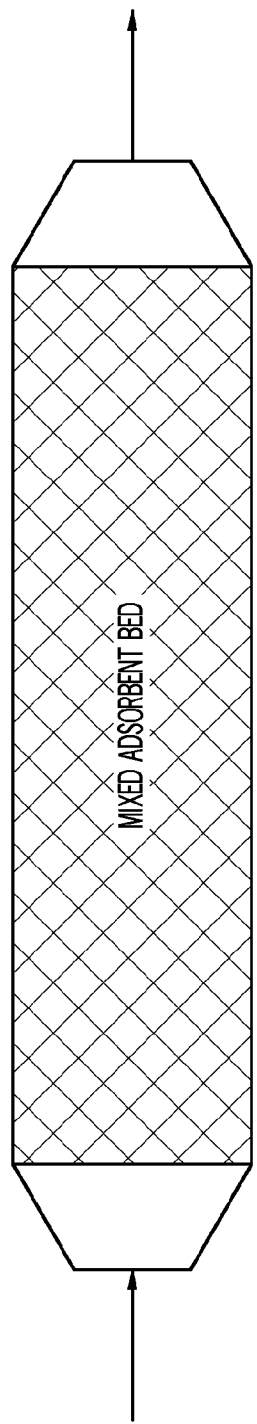

FIG. 5E depicts a mixed adsorbent treatment bed wherein physically separated adsorbent areas are not present, and the adsorbents are mixed over a support.

It should be understood, of course, that the foregoing relates to exemplary embodiments of the invention and that modifications may be made without departing from the spirit and scope of the invention as set forth in the following claims.

We claim:

1. A regenerative treatment subsystem in an environmental control system, comprising:
   a first treatment bed having a first set of separate adsorbent areas;
   wherein each area of the first set of adsorbent areas adsorbs one or more constituent types that are different from the constituent types adsorbed by the other areas of the first set of absorbent areas; and
   a second treatment bed having a second set of separate adsorbent areas;
   a first solenoid valve upstream of the first treatment bed;
   a second solenoid valve upstream of the second treatment bed;
   wherein the first solenoid valve is operatively at a first inlet in and at a first outlet in the first treatment bed;
   wherein the first inlet is separate from the first outlet;
   wherein the second solenoid valve is operatively at a second inlet in and at a second outlet in the second treatment bed;
   wherein the second inlet is separate from the second outlet;
   a first non-return valve downstream of the first treatment bed;
   a second non-return valve downstream of the second treatment bed;
   wherein the first and second non-return valves allow flow in only one direction;
   wherein the first and second non-return valves allow air to pass through and exit the subsystem as treated air and, at the same time, prevent backflow of the treated air into the first and second treatment beds;
   wherein the first and second treatment beds can cycle between an adsorption phase and a desorption phase; and
   wherein the desorption phase is enabled by:
      purging an orifice at one of the first and second non-return valves; and
      allowing a fraction of the treated air to pass one of the first and second treatment beds backwards and out of one of the first and second outlets, via one of the first and second solenoid valves.

2. The subsystem of claim 1, wherein the first set of adsorbent areas include only one zeolite.

3. The subsystem of claim 1, wherein the first set of adsorbent areas include at least two different zeolites.

4. The subsystem of claim 1, wherein each area in the first set of adsorbent areas has the same adsorbent time.

5. The subsystem of claim 1, wherein each area in the first set of adsorbent areas has a different adsorbent time.

* * * * *